No. 761,754. Patented June 7, 1904.

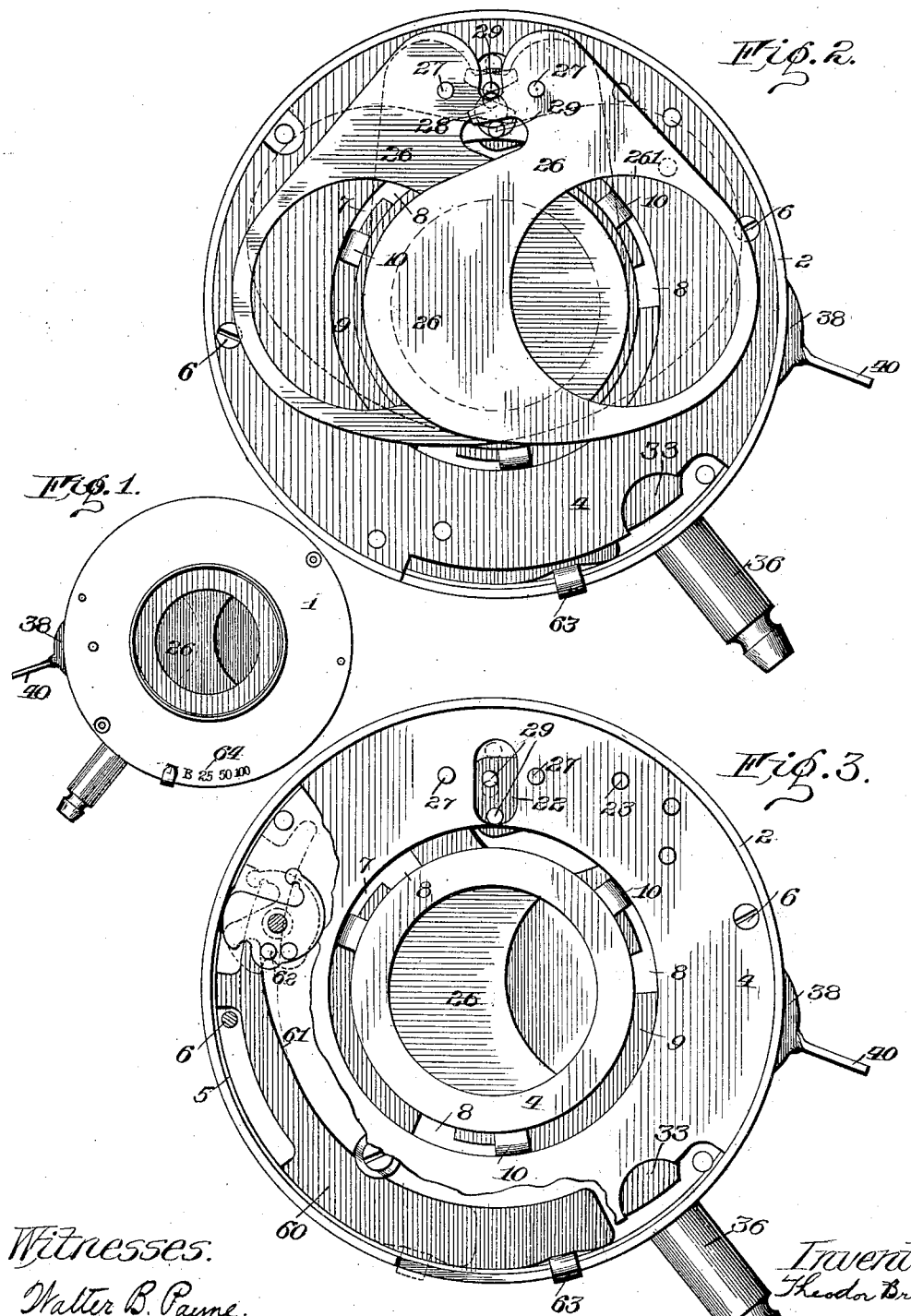
No. 761,754. PATENTED JUNE 7, 1904.
T. BRUECK.
PHOTOGRAPHIC SHUTTER.
APPLICATION FILED DEC. 14, 1900.
MODEL. 3 SHEETS—SHEET 1.

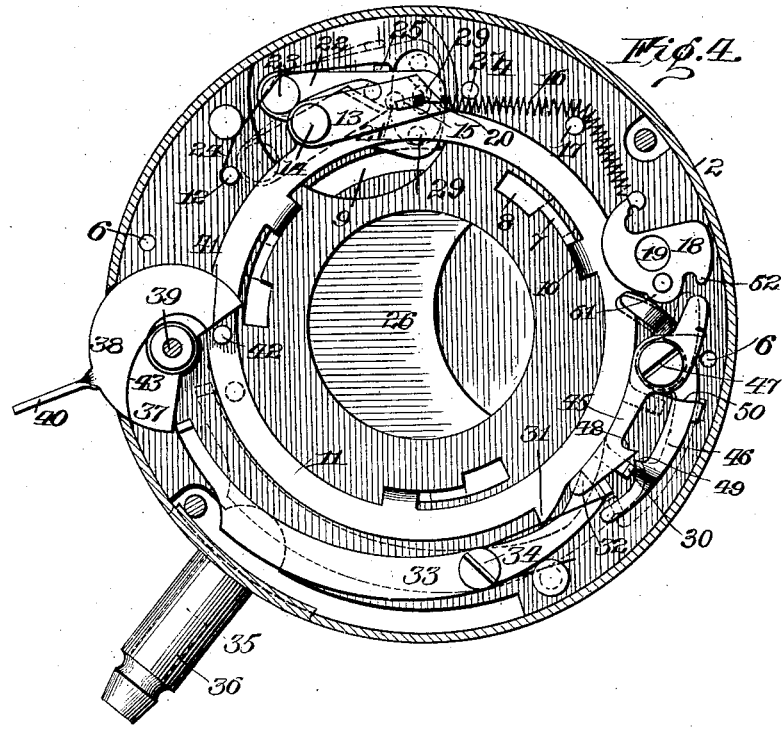

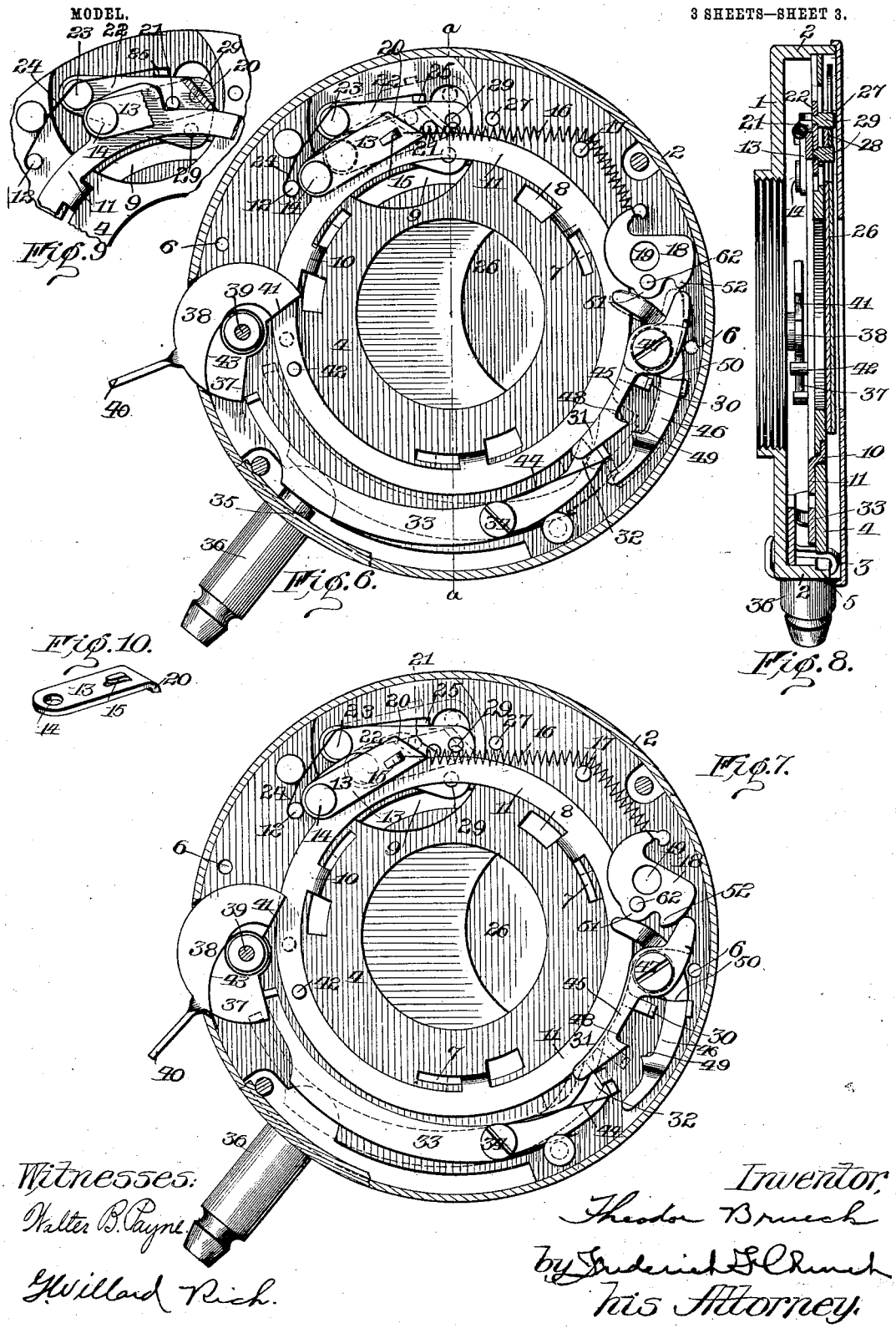

UNITED STATES PATENT OFFICE.

THEODOR BRUECK, OF ROCHESTER, NEW YORK, ASSIGNOR TO THE BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 761,754, dated June 7, 1904.

Application filed December 14, 1900. Serial No. 39,825. (Model.)

*To all whom it may concern:*

Be it known that I, THEODOR BRUECK, of Rochester, in the county of Monroe and State of New York, have invented certain new and useful Improvements in Photographic Shutters; and I do hereby declare the following to be a full, clear, and exact description of the same, reference being had to the accompanying drawings, forming part of this specification, and to the reference-numerals marked thereon.

My present invention relates to photographic shutters, and has for its object to simplify and improve the construction and operation whereby the parts may be readily formed and assembled, making the shutters small and compact, and at the same time they are of such a nature that they will not get out of order; and it consists of certain improvements hereinafter fully described, the novel features being pointed out in the claims at the end of this specification.

In the drawings, Figure 1 is a front elevation of a shutter constructed in accordance with my invention. Fig. 2 is a view of the shutter proper or light-excluding media, the rear of the casing being removed. Fig. 3 is a view of the parts with the rear of the casing removed, the intermediate supporting-plate being partially broken away, showing the setting or controlling devices. Fig. 4 is a view with the front of the casing removed, showing the operating parts in normal position and adapted to make a time exposure. Fig. 5 is a similar view showing in full lines the position assumed by the operating parts when the shutter is open and in dotted lines the position assumed by them when pressure upon the releasing-catch is relieved. Fig. 6 is a view similar to Fig. 4 with the shutter set for bulb exposures. Fig. 7 is a similar view with the shutter set for making instantaneous exposures. Fig. 8 is a vertical sectional view on the line *a a* of Fig. 6. Fig. 9 is a detail view with a part broken away of the latch connection between the master member and the shutter. Fig. 10 is a detail perspective view of the latch on the end of the master member.

Similar reference-numerals in the several figures indicate similar parts.

The shutter-casing is of annular form, embodying the ring frame 2, the front plate 1, (which, if desired, may be formed integral with the ring frame,) and the back or cover plate 3, which may form the support for the diaphragm, if desired, or be capable of attachment directly to a camera or other suitable support, and as the shutter is particularly adapted for use between the combinations of the objective the front and rear plates of the casing are provided with means for the attachment of the lens thereto. Arranged within the casing is a septum, partition, or plate 4, upon which the operating parts of the shutter are mounted, said plate or septum being secured in any suitable manner to the front or back plate, or both, or to the ring plate, if desired; but I prefer to provide the ring plate 2 with a shoulder 5, against which the plate 4 is held by suitable securing-screws 6. Both the front and rear plates of the casing and also the septum or partition 4 are provided with central apertures in line with the objective, and the plate 4 is provided with segmental slots 7 concentric with the central aperture, said slots being enlarged at one end 8, as shown, and on the rear side of the plate (shown in Fig. 3) is formed a groove 9, extending part way through the plate for the accommodation of lugs or ears 10, formed upon or attached to the master member 11 in the form of an annular plate or ring located upon the front side of the septum, the shanks of the lugs or ears passing through and operating in the slots 7. The lugs are prevented from passing into the enlarged portions 8 of the slots by the contact of the master member or a projection thereon with a suitable stop—such, for instance, as a pin 12. (See Figs. 4, 5, and 7.) The ring or annular master member 11 is thus capable of a limited oscillatory motion upon the support, the oscillation in one direction being caused by a spring and that in the other by the movement imparted to it by the operator in setting the shutter.

13 indicates a latch or pawl pivoted to the master member at 14 and having a lug or ear 15, to which is connected the operating-spring 16, said spring extending over a stationary pin 17 and attached at the opposite end to an adjusting member 18, pivoted at 19 to the support 4. The forward free end of the latch 13 is provided on its under side with an inclined rib or projection 20, extending downward into the plane of the lower face of the master member and contacting at its inner end with the latter. The edge or shoulder 20 of the latch is arranged at an angle to the line of movement of the member and is adapted to engage with a pin or projection 21, located on a lever 22, pivoted at 23 to the support 4, the oscillations of said arm or lever 22 on its pivot operating the light-excluding media or shutter proper, the arrangement of the pivots of the operating-lever and the shoulder or projections 20 on the latch being such that as the master member is moved to the right, Figs. 5, 6, and 7, the shoulder 20 will engage beneath the projection 21 and will move the lever outward on its pivot by reason of the incline, then permit the lever to fall again after the incline has passed, said falling movement being caused by a spring, such as 24, engaging the lug or ear 25 on the lever, and when the master member is moved to the left again, as in setting the shutter, the under side of the incline or projection 20 on the latch will cause the latch to be lifted. From this it will be seen that the master member may be moved in one direction—to the left—without moving the lever or arm 22, the latch yielding at this time; but when it is moved in the opposite direction by the spring 16 the lever or part 22 will be given its maximum movement and then released, and if said lever or part 22 be arranged to open the shutter when moved in one direction and to close the same when moved in the opposite direction and the movement of the master member is controlled provision can readily be made for making instantaneous, time, and bulb exposures.

The particular form of the shutter proper is not essential to the operation of the parts described; but I prefer to employ the shutter-wings 26, pivoted upon the projections 27 on the rear side of the support 4 and having the overlapping light-excluding portion formed at the side of the apertures 26¹, as shown in Fig. 3, and also provided with overlapping short projections or arms 28, adapted to extend between the pins or projections 29, formed on the rear side of the arm or lever 22 and projecting through an aperture formed in the plate 4, (see Figs. 3 and 4,) so that when the lever 22 is moved toward the center the shutter-leaves will overlap, as shown in Fig. 3 in full lines, preventing the passage of light-rays. Then when the lever 22 is moved outwardly the leaves will be moved in the opposite direction, permitting the passage of light.

This arrangement of providing the tongues or projections on the shutter-leaves and the pins on the lever 22 permits the parts to be cheaply constructed and the necessary relative movement to be accomplished and at the same time causing the simultaneous movement of both the plates or leaves.

The annular master member is provided with a holding projection or lug 30, preferably turned outwardly above the plane thereof and formed integral therewith, and is also provided with a shoulder or stop 31, with which coöperates a lug or projection 32, formed on the end of a holding catch or lever 33, pivoted at 34, said catch extending to the opposite side of the casing and in position to be acted upon by a piston 35, operating in a cylinder 36, and also by the arm 37 on the setting and releasing member 38, pivoted at 39, and having an operating end 40, extending to the exterior of the casing through a slot formed therein. This lever 38 is also provided with an arm or shoulder 41, adapted to contact with a pin or projection 42 on the master member 11, and is operated in one direction by a small light spring 43, the construction and arrangement of these parts being such that when the member 38 is moved in the direction indicated by the arrow in Fig. 4 it will engage the master member and turn it to the left to set the shutter for operation until the catch 33 engages the projection 31, as shown in dotted lines in Fig. 6, and upon moving the member 38 in the opposite direction the shoulder 37 will engage the catch 33 and release the master member, permitting it to be moved in the opposite direction by its operating-spring 16 and causing the opening and closing of the shutter-leaves.

With the parts just described the shutter is adapted only for making instantaneous exposures, and in order to adapt it for time or bulb exposures it is necessary to retain the master member in intermediate positions in engagement with the operating stud or pin 21 on the lever 22, and for this purpose I provide retaining levers or parts 45 and 46, pivoted at 47 and having the projections 48 and 49, adapted to coöperate with the projection or lug 30 on the master member. The engaging ends of the levers 45 and 46 are moved toward each other by a spring 50, encircling the pivot, and connected at opposite ends to the levers, as shown in Fig. 7, and the free ends of the levers beyond the catches are arranged to be operated upon by the projections 32 on the end of the lever 33. The upper ends or tails of the retaining-levers above the pivot are adapted to be engaged with the projections 51 and 52, formed upon the adjusting member 18, so as to hold one or both of them out of coöperative relation with the master member when desired, and the operating projections 48 and 49 on said retaining-levers are so arranged that the projection 48 extends slightly in advance of the projection 49 in the path of the stop or projection 30 on the master member. From this construction it will be seen that when it is desired to make a time exposure the adjusting member 18 is set to the position shown in Figs. 4 and 5 and out of engagement with both of the retaining members or devices, and then the master member having been set with its spring under tension by the movement of the setting and releasing member 38 to the position shown in Fig. 4 the member 38 is operated to release the master member, causing the shutter to be thrown open, the master member being then arrested by engagement of the projection 30 with the stop 48, the latch on the master member holding the lever 22 raised, as in Fig. 5. Then upon releasing the pressure upon the member 38 the inward movement of the projection 32 on the catch 33 disengages the stop 48 and permits the stop 49 to engage and retain the master member; but upon the second operation of the outer end of the member 38 downward the catch 33 disengages the stop 49, and the latch 13, passing from beneath the projection on the lever 22, permits the shutter to close.

When it is desired to make a bulb exposure, the adjusting member 18 is moved to the position shown in Fig. 6, the projection 51 holding the retaining-lever 49 out of the path of the stop 30. Then when the master member has opened the shutter as before the downward movement of the member 38 will cause the release of the catch 33 from the projection 31 and permit the latter to be arrested by the stop 48 on the lever 45, holding the shutter open until the pressure upon the member 38 is released and the spring 44 will return the catch 33 to normal position (shown in full lines in Fig. 6) and causing the release of the projection 30 and permitting the master member to complete its movement and close the shutter.

When it is desired to make an instantaneous exposure, the master member is set as before and the adjusting member 18 moved so that the projections 51 and 52 thereon will engage both retaining-levers 45 and 46 and move them out of coöperative relation with the said master member, so that the latter may be set and retained by the catch-lever 33 and then released and allowed to make a full movement without interruption. The ends of the levers 45 and 46 and the stops 51 and 52 on the adjusting member 18 are so arranged that the latter member may be given a fuller movement than is necessary to merely cause the disengagement of the lever, and as it is connected to the end of the operating-spring 16 any additional movement beyond the mere release of the levers will put the spring 16 under further tension, so that the speed of the shutter when making instantaneous exposures can to some extent be regulated.

The means for operating and holding the adjusting member 18 may be of any suitable description; but I prefer to employ a segmental plate 60, guided to slide in the casing and provided with the cam or inclined surface 61, adapted to coöperate with a pin or projection 62, formed on the member 18, and adapted to turn the latter on its pivot to the position shown in the various figures, the spring 16 holding the pin 62 against the cam-plate. The plate 60 is provided with an index-arm 63, extending through a slot in the casing and coöperating with the index or scale 64, formed on the front of the casing, as shown in Fig. 1, and embodying letters and figures, as usual, indicating the kind and approximate duration of exposures. The projection 62 is moved outwardly toward the casing by the tension of the spring 16, and when time exposures are to be made said pin is free of the plate 60; but when bulb exposures are made the end of the inclined or cam portion of the plate prevents the extreme outward movement. Then a further movement of the cam-plate brings the projection 52 in position to hold the retaining-lever 45 out of engagement, and the continued movement of the cam-plate, while it holds the stops or levers out of engagement, simply increases the tension of the spring by moving the member 18 on the pivot.

The shutter described is very simple and may be manufactured cheaply, all of the parts being constructed of stampings of sheet metal, which may be readily formed and assembled by an unskilled operator.

I claim as my invention—

1. The combination with the shutter proper, of the oscillatory annular master member, a latch connection between the member and the shutter, a spring for operating the master member in one direction, a catch for retaining it and an operating member coöperating directly with the master member to set it when moved in one direction and with the catch to release it when operated in another direction.

2. The combination with the shutter-wings, the spring for closing them and a movable projection, of the annular oscillatory master member, a latch thereon coöperating with the projection, a spring for actuating the master member, a catch for holding the master member and a single operating device for moving the master member against its spring and controlling the catch.

3. The combination with the shutter-wings, the spring for closing them, and the lever connected to the wings having the projection, of the annular oscillatory master member, the latch thereon engaging the projection and means for setting and releasing the oscillatory member.

4. The combination with the shutter proper, means for closing it, the projection connected to the shutter and the annular oscillatory master member having the latch pivoted thereon coöperating with the projection, of a spring for operating the master member and means for setting and releasing and for controlling the movements of the master member.

5. In a photographic shutter, the combination with the shutter proper and a support or plate having the central aperture, of an annular, oscillatory master member for operating the shutter and segmental guides between the member and support for guiding the former on the latter.

6. The combination with the shutter proper, the casing, and a support arranged in the casing having the central aperture, of the annular oscillatory master member, segmental guides between the member and support and means for oscillating and controlling said member.

7. The combination with the shutter proper, the casing and a support arranged in the casing having the central aperture and the segmental slots, of the master member having the lugs operating in the slots in the support and connections between the member and shutter for operating the latter.

8. In a shutter the combination with the casing and the support therein having the aperture and the segmental slots around it having the apertures at the ends, of the oscillatory member having the lugs extending through the slots and the flanges at the ends, a shutter proper and connections between the oscillatory member and the shutter for operating the latter.

9. The combination with the shutter proper, the spring for operating it and a projection connected to the shutter, of the oscillatory master member, the latch pivoted thereon having the inclined lug coöperating with the projection.

10. The combination with the shutter proper, the spring for operating it and a projection connected to the shutter, of the oscillatory master member, the latch pivoted thereon having the inclined portion for coöperating with the projection and the spring connected to the latch for holding it in position to engage the projection and operating the master member in one direction.

11. The combination with the shutter proper, the spring for closing it, the projection moving with the shutter, the annular oscillatory master member, the latch thereon having the incline engaging the projection and the spring connected to the latch, of a catch for holding the master member and a single operating member movable in two directions and coöperating with the master member when moved in one direction and with the catch when moved in another direction.

12. The combination with the shutter proper and means for closing it, the support having the central aperture, the annular oscillatory master member and a latch connection between it and the shutter, of a catch for holding the master member, and the pivoted operating member having portions engaging the master member and the catch respectively when moved in opposite directions on the pivot.

13. The combination with the shutter proper and the projection connected thereto, the annular master member, the latch pivoted thereon having the inclined shoulder and the spring connected to the latch for holding it against the member and moving the latter in one direction, a catch for holding the master member and the operating member engaging the catch and the master member respectively when moved in opposite directions.

14. The combination with the movable apertured blades, of the rotatory ring provided with the pawl, the vibrating lever provided with the pin interposed in the path of the pawl, the release-lever and the operating-spring.

THEODOR BRUECK.

Witnesses:
 WALTER B. PAYNE,
 G. WILLARD RICH.